United States Patent Office 3,391,111
Patented July 2, 1968

3,391,111
POLYURETHANES PREPARED FROM HALOGEN SUBSTITUTED BISPHENOLS
Paul Winthrop Morgan, West Chester, Pa., assignor to E. I. du Pont de Nemours and Company, Wilmington, Del., a corporation of Delaware
No Drawing. Filed Dec. 30, 1964, Ser. No. 422,395
9 Claims. (Cl. 260—47)

ABSTRACT OF THE DISCLOSURE

High molecular weight, fiber-forming and film-forming polyurethanes are prepared from a diamine or piperazine compound and the bischloroformate of a halogen substituted bisphenol. A typical polymer of the invention is poly[4,4'-methylene bis(2,6-dichlorophenylene) 4,4'-dicyclohexylene dicarbamate].

---

This invention relates to the preparation of novel and useful high molecular weight, high melting polyurethanes and to shaped articles prepared therefrom.

For various reasons, the presently known polyurethanes have not attained the commercial prominence of the polyamides and the polyesters to which they are structurally related. Fabrication of polyurethanes into fibers and films has often been hampered by poor chemical stability of the polymer at the temperatures required for melt processing or by insufficient polymer solubility for use of conventional solvent processing techniques. Moreover, the polyurethanes which have been found fabricable frequently lack the good balance of properties which is necessary for their use in fiber and film applications. Among those undesirable characteristics contributing to poor performance for polyurethane fibers and films may be named the following: melting points sufficiently low to permit filament fusion during ironing, poor hot-wet recovery properties after washing, poor flex performance, sensitivity to dry cleaning solvents, and sensitivity to light.

One object of this invention is to provide polyurethanes suitable for the production of light-stable, high melting flexible films and filaments. A further object is to provide polyurethane fibers which are particularly adaptable for fabrics that are wash-wearable, i.e., fabrics which ideally resist wrinkling in use and which can be laundered and subsequently worn without ironing. Other objects will appear hereinafter.

The novel, high molecular weight fiber- and film-forming polyurethanes of this invention possess recurring units represented by the following structural formula:

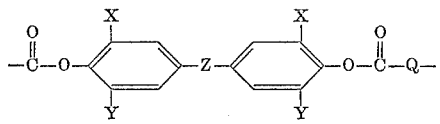

wherein X represents a hydrogen, bromine, or chlorine atom; Y represents a chlorine or bromine atom; Z represents

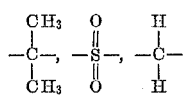

4,4'-cyclohexylidene or a carbon-to-carbon bond; and Q represents piperazinylene, lower alkyl substituted piperazinylene and

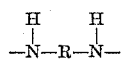

radicals where R is alkylene of up to 6 carbon atoms, meta-xylylene, α,α,α',α'-tetramethyl-para-xylylene, lower alkylidene di(para-phenylene), or lower alkylidene di(para-cyclohexylene).

The aforementioned polyurethanes can be made by reacting certain diamines with certain bischloroformates as more specifically defined below.

Suitable diamine reactants are piperazine, the lower alkyl substituted piperazines and diamines of the formula

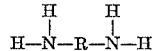

where R has the significance designated above. Illustrative of such diamines are methylpiperazine, trans-2-5-dimethylpiperazine, ethylenediamine, hexamethylenediamine, bis(4 - aminocyclohexyl)methane (100% - trans, trans isomer), meta - xylylenediamine, α,α,α',α' - tetramethyl-para-xylylenediamine, and 4,4'-isopropylidenedianiline.

Suitable bischloroformates for the purpose of this invention may be represented by the formula

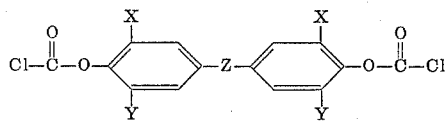

wherein Z is as defined above. Illustrative of such compounds are the bischloroformates of 4,4'-isopropylidene bis(2,6-dichlorophenol), 4,4'-isopropylidene bis(2,6-dibromophenol), 4,4'-isopropylidene bis(2-chlorophenol), 4,4'-sulfonyl bis(2,6-dichlorophenol), 4,4'-methylene bis-(2-chlorophenol), 4,4'-methylene bis(2,6-dichlorophenol), 2,2' - dichloro - 4,4' - biphenol, 2,2',6,6' - tetrachloro-4,4'-biphenol and 4,4'-cyclohexylidene bis(2,6-dichlorophenol).

The preferred polyurethanes are those prepared from the bischloroformate of 4,4'-isopropylidene bis(2,6-dichlorophenol) and methylpiperazine or bis(4-aminocyclohexyl)methane (100% trans, trans isomer), respectively. Other useful polyurethanes of this invention include poly(2,2',6,6' - tetrachloro - 4,4' - diphenylene 1,4 - piperazinedicarboxylate), poly[4,4'-sulfonyl bis(2,6-dichlorophenylene) 2-methyl-1,4-piperazinedicarboxylate], poly-[4,4'-cyclohexylidene bis(2,6-dichlorophenylene) trans-2,5-dimethyl-1,4-piperazinedicarboxylate], and poly[4,4'-methylene bis(2,6-dichlorophenylene) 4,4'-dicyclohexanecarbamate].

The instant polymers may be prepared from nearly equimolar amounts of the bischloroformate of the appropriate bisphenol and diamine by an interfacial polymerization which is accomplished by dissolving the diamine in aqueous alkali, dissolving the bischloroformate in a water-immiscible organic solvent, and combining the two phases with vigorous agitation. A catalyst, such as a quaternary ammonium salt may be added, if desired. A second organic solvent, different from the one in which the bischloroformate is dissolved, may be added at the conclusion of the reaction period in order to precipitate the polymer. In some instances, it may be desirable to dissolve the diamine in a small amount of the former organic solvent before the bischloroformate portion is mixed with the diamine-alkali portion. This procedure is beneficial when the diamine has low solubility in water.

The polyurethanes of the present invention may also be prepared by modification of the usual interfacial polymerization method. This modification consists in the use of two solvents which are initially miscible with each other, for example, tetrahydrofuran and water, but which become immiscible as the polymerization reaction proceeds. When the polymerization is completed, the two liquid layers are separated and the polymer-containing portion is used directly for the dry spinning of filaments.

The polyurethanes of this invention can be cast into films or dry spun into filamentary form from solutions containing about 10 to 30% by weight of the polymer dissolved in a solvent selected from the class consisting of cyclic ketones, lower dialkyl aliphatic amides, cyclic ethers, mixtures of lower chlorinated hydrocarbons with lower perhalogenated aliphatic monocarboxylic acids. Preferred representatives from this class of solvents are cyclohexanone, N,N-dimethylformamide, tetrahydrofuran, and mixtures of 1,1,2-trichloroethane with trifluoracetic acid. Filaments may also be prepared by conventional wet spinning techniques. The instant polymers are readily and permanently orientable by attenuation and can be obtained in a crystalline state.

The polyurethanes of this invention possess melting points in excess of 200° C., with some having melting points in excess of 400° C. This thermal stability is an important property in synthetic textile trade, since many promising synthetic fibers have had only limited acceptance due to the low softening temperatures which they exhibit. Fibers and films prepared from the polymers of this invention display excellent resistance to degradation by ultraviolet light, as witnessed by their stability to prolonged exposure (greater than 1000 hours) to the light from a xenon arc placed in a Model FDA-R Fade-Ometer, a product of the Atlas Electric Devices Company, Inc., Chicago, Illinois. In contrast to the textile products obtained from the polyurethanes of the prior art, the unusual combination of desirable properties shown by filaments and fabrics prepared from these polyurethanes favors their commercial acceptance in the textile trade. Included in this array of properties, in addition to the previously cited thermal stability and resistance to degradation by light, are compatability with commercial dry cleaning solvents, an excellent recovery of form without ironing when exposed to hot-wet conditions of home laundering, low shrinkage in boiling water, excellent resistance to degradation by aqueous solutions of alkali and mineral acids, excellent resistance to degradation and discoloration by household hydrochlorite bleaches, and resistance to degradation by the thermal action of ironing at 200° C. after bleaching treatment. Films prepared from the polyurethanes of this invention are clear and flexible and are useful as wrapping or packaging materials, containers, covers, closures, and related uses wherein direct exposure to elemental conditions is inherent.

solvent. The concentration (C) used in the examples is 0.5 gram of polymer per 100 ml. of solution and the measurements are made at 30° C. Unless otherwise specified, inherent viscosities are measured in meta-cresol. The polymers of the invention have inherent viscosities greater than 0.2 when measured by the above method. The production of fibers ordinarily requires polymers having viscosities of somewhat higher values. As used herein, the "polymer melt temperature," abbreviated "PMT," is defined as that temperature at which a polymer sample becomes molten and leaves a trail when moved across a hot metal surface under moderate pressure.

Example I

This example illustrates the preparation of a polyurethane of this invention by interfacial polymerization.

To a mixture of 5.26 grams (0.025 mole) of bis(4-aminocyclohexyl)methane (30%-trans, trans isomer), 5.3 grams of sodium carbonate, 50 ml. of 1,2-dichloroethane, and 250 ml. of water in a Waring Blendor is added a solution of 12.28 grams, 0.035 mole) of 4,4'-isopropylidene bis(2,6-dichlorophenyl-chloroformate) in 100 ml. of 1,2-dichloroethane. The reaction mixture is vigorously agitated for four minutes, after which a quantity of n-hexane is added to precipitate the polymer. The dried, granular polymer weighs 15.2 grams and has a polymer melt temperature of 240° C.; $\eta_{inh}=0.76$.

In Table I, below, are summarized some physical properties of various polyurethanes of this invention which are prepared in accordance with the interfacial polymerization techniques previously described. Each of the polymers consists essentially of recurring units of the following formula:

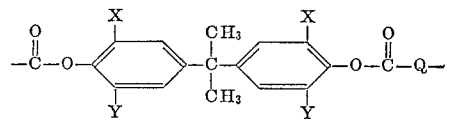

In Table I, the nature of the bischloroformate substituents, designated by X and Y in the above generic formula, is tabulated, and the column entitled "Diamine" denotes the diamine from which the —Q— portion of the polyurethane recurring unit is derived.

TABLE I

| Example | X | Y | Diamine | PMT, ° C. | $\eta$ inh |
|---|---|---|---|---|---|
| II | H | Cl | Methylpiperazine | [1]348 | 1.11 |
| III | Cl | Cl | ___do___ | >400 | 1.14 |
| IV | Cl | Cl | Trans-2,5-dimethylpiperazine | >400 | 1.68 |
| V | Cl | Cl | Bis(4-aminocyclohexyl)methane (70%-trans, trans isomer). | 230 | 1.52 |
| VI | Cl | Cl | Bis(4-aminocyclohexyl)methane (100%-trans, trans isomer). | 278 | 1.0 |
| VII | Cl | Cl | Ethylenediamine | 240 | 0.45 |
| VIII | Cl | Cl | Hexamethylenediamine | 212 | 0.70 |
| IX | Cl | Cl | 4,4'-isopropylidenedianiline | 205 | 0.57 |
| X | Cl | Cl | 4,4'-methylenedianiline | 245 | 0.26 |
| XI | Cl | Cl | Meta-xylylenediamine | 254 | 0.45 |
| XII | Br | Br | Methylpiperazine | 326 | 0.51 |
| XIII | Br | Br | Trans-2,5-dimethylpiperazine | >400 | 0.54 |
| XIV | Cl | Cl | $\alpha,\alpha,\alpha',\alpha'$-Tetramethyl-para-xylylenediamine | 220 | 0.37 |

[1] Dec.

The following non-limiting examples are illustrative of the practice of the preferred embodiment of the invention. In these examples, inherent viscosity ($\eta_{inh}$) has been determined in accordance with the following equation:

$$\eta_{inh}=\frac{\ln(\eta_{rel})}{C}$$

The relative viscosity ($\eta_{rel}$) may be determined by dividing the flow time in a capillary viscometer of a dilute solution of the polymer by the flow time for the pure In Table II, below, are shown properties of fibers prepared by conventional wet and dry spinning techniques from representative polymers selected from the previous examples. In Table II, the column headed "Polymer of Example" refers to the previous example wherein the given polymer is described. Other column headings describe the drawing conditions to which the as-extruded filaments are subjected and indicate the resultant fiber properties of tenacity, elongation, and initial modulus (all expressed in their conventional units) thus obtained, plus the denier per filament.

TABLE II

| Example | Polymer of Example | Drawing | Fiber Properties | | | |
|---|---|---|---|---|---|---|
| | | | T | E | Mi | DPF |
| XV [1] | II | 3.75× at 240° C | 1.54 | 27.4 | 34 | 2.44 |
| XVI [2] | V | 2.3× at 210° C | 1.98 | 12.6 | 28 | 3.3 |
| XVII [3] | VIII | 3.25× at 155° C | 0.91 | 94.7 | 22.4 | 4.42 |

[1] Dry spun from a solution of 1,1,2-trichloroethane/trifluoroacetic acid (70/30, w./w. containing 25% solids.
[2] Wet spun from a tetrahydrofuran solution containing 15% solids.
[3] Dry spun from a solution of tetrahydrofuran/1,1,2-trichloroethane (90/10, w./w.) containing 28% solids.

EXAMPLE XVIII

This example further illustrates the preparation of useful fibers and fabrics from a representative polyurethane of this invention.

60 grams of a polyurethane prepared from the bis-chloroformate of 4,4'-isopropylidene bis(2,6-dichlorophenol) and methylpiperazine is dissolved in 190 grams of a solution of tetrahydrofuran/1,1,2-trichloroethane (90/10 by weight) to form a spinning solution having a viscosity of 120 poises at 25° C. This solution is dry spun by conventional means, the resulting filaments are plied three times, dried in air, and drawn 3× at 240° C. to produce fibers exhibiting T/E/Mi values of 3.3/20/42, with a denier per filament value of 2.33. These fibers exhibit excellent tensile and work recovery properties when measured at both 3 and 5% elongation under both 21° C./65% relative humidity and 60° C./wet conditions. No change in the original tensile properties of these fibers is noted after a two-hour exposure in air in an oven maintained at 200° C.

Similarly prepared fibers of this polyurethane, which possess comparable tensile properties, retain 50% of their original tenacity, 29% of their original elongation, and 97% of their original modulus after 448 hours exposure to the light from a xenon arc in a Fade-Ometer, and show no coloration after 1,000 exposure hours.

A tafetta fabric prepared from filaments of the polymer described in this example shows excellent wrinkle-recovery after subjection to standard washing and drying tests, does not propagate burning when exposed to a direct flame and shows no discoloration or damage after being immersed in a full-strength solution of "Clorox" bleach (trademark for the Clorox Company's hypochlorite bleach which contains about 4.75% sodium hypochlorite and has a pH of 10.5). After being subjected to bleaching conditions, as just described, and after being washed and rinsed, the wet fabric sample shows no discoloration or damage when ironed at 200° C.

The amine of Example XIV can be prepared as follows:

Example A.—α,α,α',α'-Tetramethyl-p-xylylenediamine

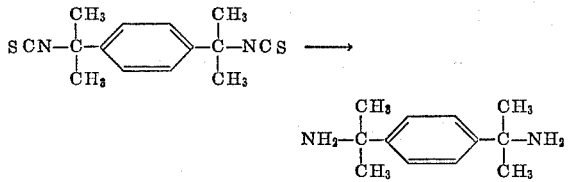

A mixture of 5 parts of potassium hydroxide (commercial grade, 87% pure) and 5 parts of α,α,α',α'-tetramethyl-p-xylylene diisothiocyanate in 40 parts of ethanol was refluxed two hours. The cooled mixture was filtered and poured into 700 parts of water. The aqueous solution was extracted with ether (350 parts in three portions), and the extracts were discarded. The aqueous solution was acidified with concentrated hydrochloric acid during which time carbon oxysulfied was evolved. The acidified solution was basified with 10% sodium hydroxide and then extracted with ether (3× 140 parts). The ether extracts were dried over sodium sulfate and evaporated leaving 3.0 parts of crude α,α,α',α'-tetramethyl-p-xylylenediamine as a yellow oil. The infrared spectrum of the diamine had absorption at 3.0μ, typical of amines, and no absorption at 4.6μ, typical of the isothiocyanate functional group.

The diamine was taken up in 35 parts of ether, and the solution was saturated with hydrogen chloride. The diamine dihydrochloride salt precipitated as a white powder which was soluble in water or ethanol. The salt sublimed at 220–250° C. at 1 mm. of pressure.

Example B.—α,α,α',α'-Tetramethyl-p-xylylenediamine

A mixture of 37.5 parts of potassium hydroxide (commercial grade, 87% pure) and 5 parts of α,α,α',α'-tetramethyl-p-xylylene diisothiocyanate in 95 parts of ethanol was refluxed two hours. The resulting suspension was acidified with concentrated hydrochloric acid, and the acidified mixture was then filtered. The filtrate was evaporated under vacuum, and the residue and the filter cake above were dissolved in water. The aqueous solution was filtered, and the clear filtrate was basified to a pH 12 with 10% aqueous sodium hydroxide. To the basic solution was added solid sodium chloride until the solution was saturated. The solution was then extracted with ether (3× 140 parts), the ether extracts were dried over sodium sulfate, and then the ether was removed by evaporation. α,α,α',α'-Tetramethyl-p-xylylenediamine, 15.5 parts (89%), was obtained as a white crystalline solid. The diamine had a boiling point of 85° C. at 0.2 mm. of pressure. The dihydrochloride salt of the diamine, infusible up to 400° C., had the following analysis:

Analysis.—Calcd. for $C_{12}H_{22}N_2Cl_2$: C, 54.34; H, 8.36; N, 10.56; Cl, 26.74. Found: C, 54.64; H, 8.58; N, 10.46; Cl, 25.49.

Example C.—α,α,α',α'-Tetramethyl-p-xylylenediamine

A mixture of 5 parts of α,α,α',α'-tetramethyl-p-xylylene diisocyanate and 15 parts of potassium hydroxide (commercial grade, 87% pure) in 40 parts of ethanol was refluxed two hours. The reaction product was poured into 300 parts of water, extracted with ether (3× 150 parts), and the aqueous phase was acidified with concentrated hydrochloric acid. The acid solution was then basified with 10% sodium hydroxide, saturated with sodium chloride by adding 100 parts of the salt, and extracted with ether (3× 105 parts). Evaporation of the ether left 1.5 parts of a white semisolid, which, on recrystallization from pentane, gave white crystals of α,α,α',α'-tetramethyl-p-xylylenediamine, M.P. 74° C. Spectral analysis confirmed that the sample was identical to that prepared in Example B.

Example D.—α,α,α',α'-Tetramethyl-p-xylylene diisothiocyanate

To a suspension of 109 parts of sodium thiocyanate in a solution of 100 parts of p-diisopropenylbenzene in 130 parts of benzene was added over one hour a mixture made up of 200 parts of concentrated sulfuric acid and 62 parts of water. The temperature was kept at 40–45° C. by external cooling. After the addition of acid was complete, the temperature of the reaction was maintained at 40–45° C. for three hours. The flask was cooled, and 500 parts of water and 450 parts of benzene were added. The layers were separated, and the benzene layer was washed consecutively with water, sodium carbonate solution and water. After drying over magnesium sulfate, the benzene was evaporated to obtain as residue a viscous yellow oil that slowly crystallized. Recrystallization from 900 parts of 2B alcohol gave 111 parts (69%) of α,α,α',α'-tetramethyl-p-xylylene diisothiocyanate as white needles, M.P. 65° C.

*Analysis.*—Calcd. for $C_{14}H_{16}N_2S_2$: C, 60.83; H, 5.84; N, 10.14; S, 23.20. Found: C, 60.79; H, 5.95; N, 10.30; S, 22.95.

What is claimed is:

1. A novel polyurethane consisting essentially of recurring units represented by the following structural formula:

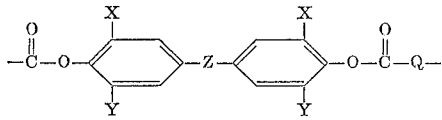

wherein X is a member of the group consisting of hydrogen, bromine, and chlorine, Y is a member of the group consisting of chlorine and bromine, Z is a member of the group consisting of

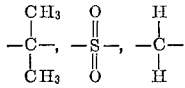

4,4'-cyclohexylidene and a carbon-to-carbon bond, and Q represents a member of the group consisting of piperazinylene, lower alkyl substituted piperazinylene, and

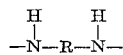

radicals wherein R is selected from the group consisting of alkylene of up to 6 carbon atoms, meta-xylylene, lower alkylidene di(para-phenylene) and lower alkylidene di-(para-cyclohexylene), said polymer having an inherent viscosity of at least 0.20 when measured as a 0.5% solution in meta-cresol at 30° C.

2. A fiber of the polymer of claim 1.

3. A high molecular weight fiber- and film-forming polyurethane consisting essentially of recurring units represented by the formula:

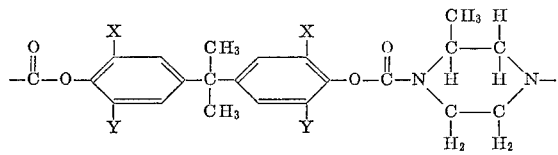

wherein X is a member of the group consisting of hydrogen, bromine and chlorine, and Y is a member of the group consisting of bromine and chlorine.

4. A high molecular weight fiber- and film-forming polyurethane consisting essentially of recurring units represented by the formula:

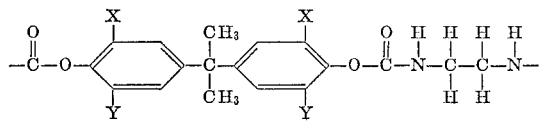

wherein X is a member of the group consisting of hydrogen, bromine and chlorine, and Y is a member of the group consisting of bromine and chlorine.

5. A high molecular weight fiber- and film-forming polyurethane consisting essentially of recurring units represented by the formula:

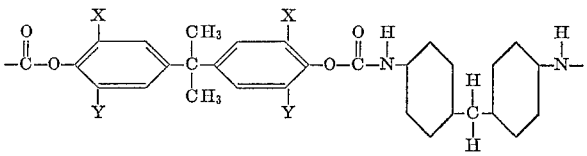

wherein X is a member of the group consisting of hydrogen, bromine and chlorine, and Y is a member of the group consisting of bromine and chlorine.

6. A high molecular weight fiber- and film-moving polyurethane consisting essentially of recurring units represented by the formula:

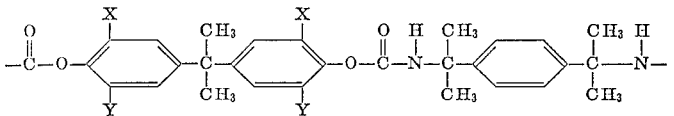

wherein X is a member of the group consisting of hydrogen, bromine and chlorine, and Y is a member of the group consisting of bromine and chlorine.

7. A method for preparing novel polyurethanes comprising reacting by interfacial polymerization, a bischloroformate of the formula:

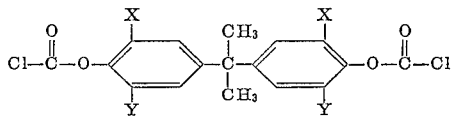

wherein X is selected from the group consisting of hydrogen bromine and chlorine, and Y is selected from the group consisting of chlorine and bromine, with a diamine selected from the group consisting of piperazine, lower alkyl substituted piperazine and diamines of the formula

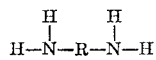

where R is alkylene of up to 6 carbon atoms, meta-xylylene, lower alkylidene di(para-phenylene) or lower alkylidene di(paracyclohexylene).

8. The process of claim 7 wherein the diamine reactant is 2-methyl piperazine.

9. The process of claim 7 wherein the diamine reactant is bis(4-aminocyclohexyl)methane.

References Cited
UNITED STATES PATENTS

| | | | |
|---|---|---|---|
| 2,731,445 | 1/1956 | Wittbecker | 260—47 |
| 3,206,438 | 9/1965 | Jamison et al. | 260—48 |
| 3,296,201 | 1/1967 | Stephens | 260—47 |

WILLIAM H. SHORT, *Primary Examiner.*

L. L. LEE, *Assistant Examiner.*